Jan. 20, 1959 F. ROHRBACH 2,870,355
ELECTRICAL BRUSH ARRANGEMENT
Filed June 26, 1956 2 Sheets-Sheet 1
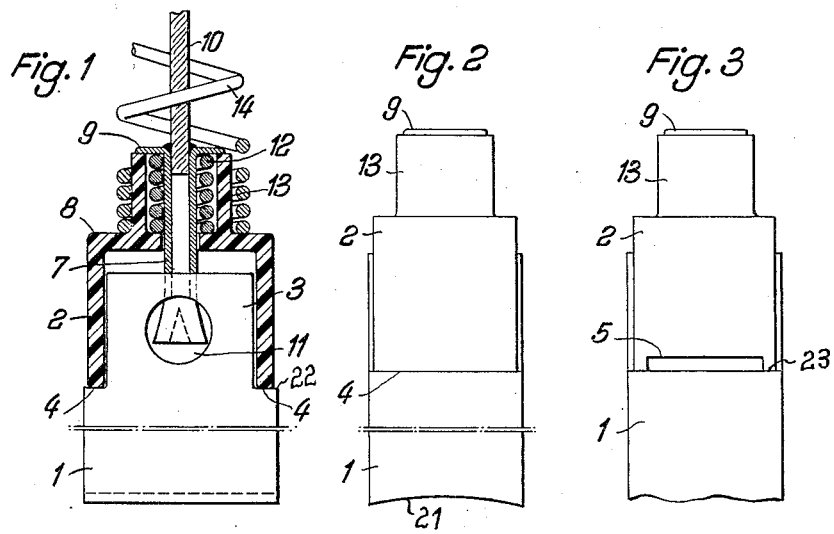
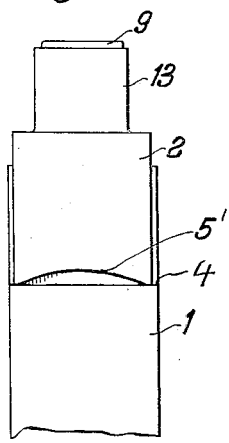
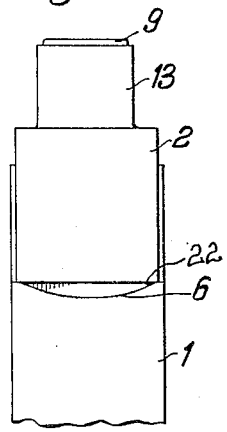
Inventor:
Fritz Rohrbach
BY:
Michael S. Striker
Agt.

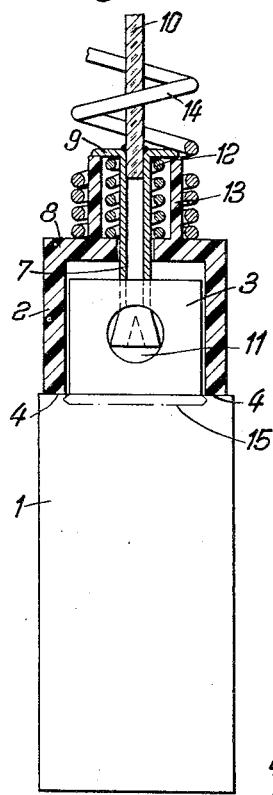
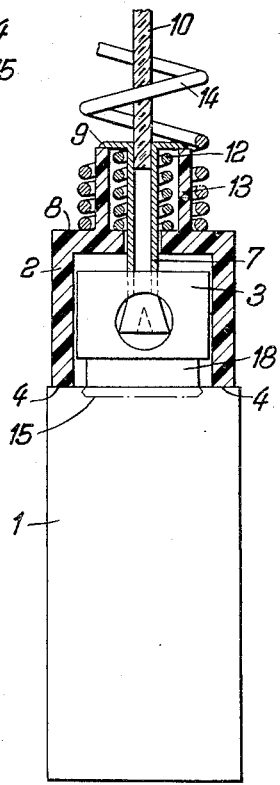
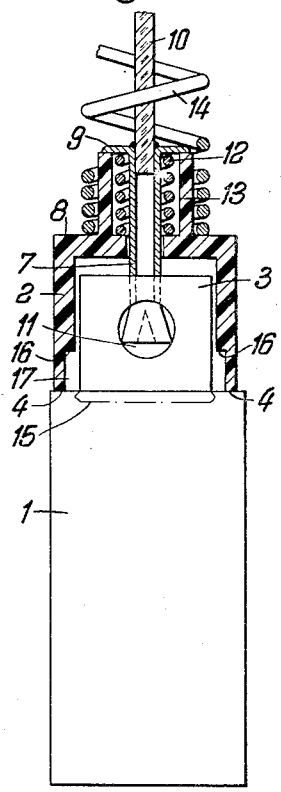

United States Patent Office 2,870,355
Patented Jan. 20, 1959

2,870,355

ELECTRICAL BRUSH ARRANGEMENT

Fritz Rohrbach, Oberursel (Taunus), Germany, assignor to Vorwerk & Co., Wuppertal-Barmen, Germany Application June 26, 1956, Serial No. 594,053

Claims priority, application Germany June 29, 1955

10 Claims. (Cl. 310—247)

The present invention relates to an electrical brush arrangement. More particularly, the present invention relates to an electrical brush arrangement having a disconnecting mechanism for moving the electrical brush out of contact with the commutator after the electrical brush has become worn more than a predetermined amount.

It is an object of the present invention to provide a new and improved brush arrangement.

Another object of the present invention is to provide a new and improved electrical brush arrangement for disconnecting the electrical brush after the same has become worn more than a pretedmined amount.

A further object of the present invention is to provide a new and improved electrical brush arrangement wherein an electrical brush is movably mounted on a holding member which is made of an electrically insulating material and which contains a spring member for moving the electrical brush out of contact with the rotating commutator when the housing is urged into contact with the commutator.

With the above objects in view the present invention mainly consists of an electrical brush arrangement for use with a rotating commutator or the like and including an electrical brush member made of an electrically conductive material and adapted to have at least a portion thereof in contact with the rotating commutator, resilient means for normally urging the portion of the electrical brush into contact with the commutator, an electrically insulated member mounted on the electrical brush and being urged with the same towards the commutator by the resilient means, the insulated member being normally spaced from the commutator by a second portion of the electrical brush whereby the insulated member is urged into contact with the rotating commutator when the second portion of the electrical brush member is worn away by the action of the commutator, and moving means actuated by the insulating member for moving the electrical brush away from the commutator when the insulated member is urged into contact with the rotating commutator.

In a preferred embodiment of the present invention, an insulating holding member is provided having an abutment portion. The brush means is mounted on the insulating holding member for movement relative thereto and having forwardly located portions engaged by the abutment portion of the insulating holding member so that the brush means is held by the insulating holding member in an advance position. Spring means are also provided abutting against the brush means and against the insulating holding member for urging the brush member into a retracted position so that when the forwardly located portion of the brush member is worn away by prolonged use, the abutment portion of the insulating holding member releases the brush member and the spring means moves the brush member into a retracted position in which the abutment portion of the holding member projects beyond the brush means.

In still another preferred embodiment of the present invention, the insulating holding member has abutment portions which contact respective shoulder portions of the electrical brush to make proper mechanical contact therewith.

In a further embodiment of the present invention the insulating holding member is made of a plastic material which can contact the rotating commutator without harming the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view, partially in section showing the spring mounting arrangements of the disconnecting springs for the electrical brush;

Fig. 2 is a side view of the embodiment shown in Fig. 1;

Fig. 3 is a side elevational view of still another embodiment of the present invention;

Fig. 4 is a side elevational view, partially in section, of still another embodiment of the present invention;

Fig. 5 is a side elevational view of a further embodiment of the present invention;

Fig. 6 is a side elevational view, partially in section, showing a disadvantage of one of the embodiments of the present invention;

Fig. 7 is a side elevational view, partially in section, of still another embodiment of the present invention for overcoming the disadvantage shown in Fig. 6; and Fig. 8 is a side elevational view, partly in section of still another embodiment capable of overcoming the disadvantage shown in Fig. 6.

Referring to the drawings, and more particularly to Figs. 1 and 2, it can be seen that an elongated brush 1 having a free end portion 21 adapted to make electrical and mechanical contact with a rotating commutator is mounted on a holding member 2 made of an electrically insulating material.

The brush 1 has a shoulder portion 4 which may be an annular shoulder portion or may consist of two parallel shoulder portions on opposite sides of a rectangular cross section brush 1. The brush 1 also has a reduced diameter portion 3 located within the recess of the holding member 2. It can be seen that the holding member 2 has an abutment portion 22 mating with the shoulder portion 4 of the brush 1.

The holding member 2 is formed with an annular shoulder portion 8 and an upper reduced diameter portion 13. Surrounding the outer surface of the reduced diameter portion 13 of the holding member 2 is a coil spring 14 which normally urges the holding member 2 and the electrical brush 1 in a downward direction in Fig. 1. That is, the upper end of the coil spring 14 abuts against a stop member, not illustrated, to force the holding member 2 and the brush member 1 towards a rotating commutator or the like (not illustrated).

Extending axially through the holding member 2 is a pin 7 having an upper flange 9. The bottom portion of the pin 7 extends into a channel 11 in the brush 1. The lower end of the pin 7 is flared outwardly in order to make a substantially solid mechanical connection with the brush 1.

Within the reduced diameter portion 13 of the holding member 2 and surrounding the outer surface of the pin 7 is a second coil spring 12 which bears upwardly against a flange 9 of the pin 7. Soldered to the upper portion of the flange 9 of the pin 7 is an electrical conductor 10 for conducting the current flowing through the brush 1.

It can be seen that the coil spring 12 tends to move the pin 7 and the brush 1 connected thereto upwardly away from the commutator. However, the spring 12 cannot move the brush upwardly beyond the abutment portion 22 of the holder 2.

Accordingly, in operation, the spring 14 urges the holding member 2 and the electrical brush 1 in a downward direction until the brush 1 makes electrical and mechanical contact with the commutator, as desired. The electrical brush 1 then operates in the normal manner to conduct current towards or away from the commutator. After a period of time, the commutator tends to wear away portions of the electrical brush. With normal arrangements, this would continue until serious sparking occurs at the commutator and the commutator segments may be subjected to abnormal wear.

However, with the present arrangement, it can be seen that when the free end portion 1 of the electrical brush wears away up until the point where the shoulder portions 4 thereof are worn away, the insulating holder 2 will be urged into contact with the commutator by the spring 14. At this exact moment, there will be nothing preventing the spring 12 from moving the pin 7 and the brush 1 in an upward direction into a retracted position within the recess of the holder 2. Therefore, the electrical brush 1 will be quickly moved upwardly out of electrical and mechanical contact with the commutator and the machine with which the electrical brush is used will cease to operate. At this point the brush can easily be replaced without any damage occurring to the commutator segments of the machine.

It can be seen that the electrically insulating material used to make up the holder 2 can be a plastic material or the like, which material will have a very low coefficient of friction so as not to abrade the commutator segments before the electrical brush can be replaced.

It is also apparent that many different methods may be used for connecting the pin 7 to the electrical brush 1. Fig. 1 shows an arrangement wherein the pin is pressed into the electrical brush and the bottom end portion flared outwardly. This end of the pin may be soldered or otherwise welded to the carbon brush at the lower end thereof. In addition, with a smaller hole, a pin may be inserted crosswise, transverse to the axis of the electrical brush for fixedly holding the pin 7 and connecting the same to the electrical brush 1.

It should be noted that once the shoulder portions 4 of the electrical brush have been worn away, the spring 12 urges the pin and electrical brush upwardly into the retracted position thereof without any opposition from the spring 14. That is, the spring 14 merely tends to urge the insulating member 2 downwardly and has no further contact with the brush 1 after the shoulder portions are worn away.

It is clear that the holder and brush may be arranged so that any predetermined thickness of brush may be worn away before the action of the present invention becomes effective to disconnect the electrical brush from the commutator.

Referring now to Fig. 3 it can be seen that the abutment portions of the member 2 are arranged in a slightly different manner. That is, a recess 5 is provided between the end abutment portions 23 of each side of the holding member 2. This will avoid any possible point contact between the plane of the shoulder portion 4 and the plane of the abutment portion 22 of Fig. 1.

Referring to Fig. 4, an arcuate recess 5' is provided in the abutment portions of the holding member 2 so that the holding member 2 only makes contact with the shoulder portions 4 of the brush 1 at the ends thereof.

Referring now to Fig. 5 an arrangement similar to Fig. 4 is shown except that an arcuate recess 6 is provided in the shoulder portion of the electrical brush 1 so that the abutment portion 22 of the holder 2 again makes contact only with two sides of the shoulder portion of the brush 1.

Referring now to Fig. 6, a slight disadvantage of the embodiments illustrated hereinabove will be explained. As the electrical brush tends to wear against the rotating commutator, it is possible that the brush will wear in such manner that when the shoulder portions 4 thereof are approached by the commutator, a small portion of the brush 1 illustrated by the dotted lines 15 of Fig. 6 will still remain. This will provide a slight play between the upper portion 3 of the brush 1 and the recess of the holder 2 so that the brush 1 may move back and forth with the commutator, sometimes making electrical contact and sometimes not making electrical contact therewith.

It is clear that if this happens, the electrical disconnection between the brush 1 and the commutator will not occur in a quick acting manner which is highly desirable.

Referring now to Fig. 7, a further improved embodiment of the present invention is indicated which overcomes the disadvantage shown in Fig. 6. In Fig. 7, it can be seen that the lower end of the holder 2, near the abutment portion thereof is provided with a larger diameter portion 17 which is spaced a greater distance from the brush 1 than the remainder of the holder 2. For this purpose the shoulder portions 16 on the inner surface of the holder 2 are provided. Therefore, in the event that the electrical brush wears away in the manner shown by the dotted line 15 of Fig. 7, it can be seen that the thinner abutment portions of the holder 2 will again permit the brush 1 to be instantly moved into its retracted position by the spring 12 as soon as the holding member 2 makes contact with the commutator.

Referring finally to Fig. 8, a further embodiment is shown wherein the disadvantage shown in Fig. 6 can also be overcome. In Fig. 8, the brush 1 is provided with a reduced diameter portion 18 between the portion 3 and the portion 1 thereof. In this embodiment, the holder 2 is similar to the holder in the arrangements of Figs. 1–6. Again, it can be seen that when the brush 1 is worn away by the commutator, the brush will be instantly moved into its retracted position by the spring 12 as soon as the holder 2 makes contact with the commutator even if the brush is worn in the manner shown by the dotted line 15.

Accordingly, as has been described hereinabove, the present invention provides a new and improved electrical brush arrangement wherein the electrical brush is quickly and easily disconnected from the commutator after it has been worn a predetermined amount. This predetermined amount can be varied to suit the particular application of the electrical brush.

It will be understood that each of the elements described above, or two or more together, may also find a useful application in other types of electrical brush arrangements differing from the types described above.

While the invention has been illustrated and described as embodied in an electrical brush arrangement having a spring actuated disconnecting means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electrical brush arrangement for use with a rotating commutator or the like, in combination, an electrically insulated holding member having an abutment portion and a recessed portion; elongated brush means movably mounted on said abutment portion of said insulated holding member and having a first free end portion adapted to contact the rotating commutator and a second free end portion spaced from said recessed portion of said holding member and shoulder means between said end portions, said abutment portion of said holding member being normally spaced from said first free end portion of said brush means and engaging said shoulder means; a first spring engaging said holding member for normally urging said holding member and said brush means towards the rotating commutator so that said first free end portion of said brush contacts the rotating commutator and said abutment portion of said holding member is spaced therefrom whereby said abutment portion of said insulated holding member is urged into contact with the rotating commutator when said first free end portion of said brush means is worn away by the action of the commutator; and a second spring connecting said brush means with said holding member for normally urging said brush means away from the commutator and said second free end portion thereof towards said recessed portion of said holding member so that said brush means is moved by said second spring away from the commutator and into said recessed portion when said first free end portion and said shoulder means are worn off and the abutment portion of the holding member contacts the commutator.

2. In an electrical brush arrangement for use with a rotating commutator or the like, in combination, an electrically insulated holding member having spaced abutment portions, each of said portions being formed with recesses; elongated brush means movably mounted on said spaced abutment portions of said insulated holding member and having a free end portion adapted to contact the rotating commutator and shoulder means rearwardly of said end portion, said abutment portions of said holding member being normally spaced from said free end portion of said brush means and engaging said shoulder means; a first spring engaging said holding member for normally urging said holding member and said brush means towards the rotating commutator so that said free end portion of said brush contacts the rotating commutator and said abutment portions of said holding member are spaced therefrom whereby said abutment portions of said insulated holding member are urged into contact with the rotating commutator when said free end portion of said brush means is worn away by the action of the commutator; and a second spring connecting said brush means with said holding member for normaly urging said brush means away from the commutator and towards said holding member so that said brush means is moved by said second spring away from the commutator when said free end portion and said shoulder means are worn off and the abutment portions of the holding member contact the commutator.

3. In an electrical brush arrangement for use with a rotating commutator or the like, in combination, an electrically insulated holding member having spaced abutment portions, each of said portions being formed with arcuate recesses; elongated brush means movably mounted on said spaced abutment portions of said insulated holding member and having a free end portion adapted to contact the rotating commutator and shoulder means rearwardly of said end portion, said abutment portions of said holding member being normally spaced from said free end portion of said brush means and engaging said shoulder means; a first spring engaging said holding member for normally urging said holding member and said brush means towards the rotating commutator so that said free end portion of said brush contacts the rotating commutator and said abutment portions of said holding member are spaced therefrom whereby said abutment portions of said insulated holding member are urged into contact with the rotating commutator when said free end portion of said brush means is worn away by the action of the commutator; and a second spring connecting said brush means with said holding member for normally urging said brush means away from the commutator and towards said holding member so that said brush means is moved by said second spring away from the commutator when said free end portion and said shoulder means are worn off and the abutment portions of the holding member contact the commutator.

4. In an electrical brush arrangement for use with a rotating commutator or the like, in combination, an electrically insulated holding member having an abutment portion; elongated brush means movably mounted on said abutment portion of said insulated holding member and having a free end portion adapted to contact the rotating commutator and shoulder means rearwardly of said end portion, said abutment portion of said holding member being normally spaced from said free end portion of said brush means and engaging said shoulder means, the shoulder means of said elongated brush means mating with said abutment portion of said insulated holding member having a recessed portion spaced from said abutment portion; a first spring engaging said holding member for normally urging said holding member and said brush means towards the rotating commutator so that said free end portion of said brush contacts the rotating commutator and said abutment portion of said holding member is spaced therefrom whereby said abutment portion of said insulated holding member is urged into contact with the rotating commutator when said free end portion of said brush means is worn away by the action of the commutator; and a second spring connecting said brush means with said holding member for normally urging said brush means away from the commutator and towards said holding member so that said brush means is moved by said second spring away from the commutator when said free end portion and said shoulder means are worn off and the abutment portion of the holding member contacts the commutator.

5. In an electrical brush arrangement for use with a rotating commutator or the like, in combination, an electrically insulated holding member having a recessed portion with a reduced and an enlarged diameter portion and an abutment portion adjacent said enlarged diameter portion; elongated brush means movably mounted on said abutment portion of said insulated holding member, said brush means having a shoulder portion contacting said abutment portion of said holding member and a reduced diameter portion within said recessed portion of said holding member and spaced from said enlarged diameter portion of said holding member, said brush means further having a free end portion forwardly of said shoulder portion and adapted to contact the rotating commutator, said abutment portion of said holding member being normally spaced from said free end portion of said brush means; a first spring engaging said holding member for normally urging said holding member and said brush means towards the rotating commutator so that said free end portion of said brush contacts the rotating commutator and said abutment portion of said holding member is spaced therefrom whereby said abutment portion of said insulated holding member is urged into contact with the rotating commutator when said free end portion of said brush means is worn away by the action of the commutator; and a second spring connecting said brush means with said holding member for normally urging said brush means away from the commutator and towards said holding member so that said brush means is moved by said second spring away from the commutator when said free end portion and said shoulder means are worn off and the abutment portion of the holding member contacts the commutator.

6. In an electrical brush arrangement for use with a rotating commutator or the like, in combination, an electrically insulated holding member having a recessed portion and an abutment portion; elongated brush means movably mounted on said abutment portion of said insulated holding member, said brush means having a shoulder portion contacting said abutment portion of said holding member and a reduced diameter portion within said recessed portion of said holding member and spaced from the same, said brush means further having a free end portion forwardly of said shoulder portion and adapted to contact the rotating commutator, said abutment portion of said holding member being normally spaced from said free end portion of said brush means; a first spring engaging said holding member for normally urging said holding member and said brush means towards the rotating commutator so that said free end portion of said brush contacts the rotating commutator and said abutment portion of said holding member is spaced therefrom whereby said abutment portion of said insulated holding member is urged into contact with the rotating commutator when said free end portion of said brush means is worn away by the action of the commutator; and a second spring connecting said brush means with said holding member for normally urging said brush means away from the commutator and towards said holding member so that said brush means is moved by said second spring away from the commutator when said free end portion and said shoulder means are worn off and the abutment portion of the holding member contacts the commutator.

7. In an electric brush arrangement, in combination, an insulating member having an abutment portion; brush means mounted on said insulating member for movement relative thereto and having a portion located forwardly of said abutment portion of said insulating member and engaged by said abutment portion in an advanced position of said brush means; main spring means abutting against said insulating member for advancing said insulating member and thereby said brush means in said advanced position whereby forward portion of said brush means is pressed against said abutment portion of said insulating member when said brush means engages a commutator; a tubular electrically conductive pin member secured at the forward end thereof to said brush means and projecting rearwardly from said brush means, said tubular electrically conductive pin member having a flange at the rear end thereof; a retracting coil spring surrounding said pin member and having a forward end portion abutting against said insulating member and a rear end portion abutting against said flange for urging said brush means in a rearward direction and said forward portion of said brush means into engagement with said abutting portion of said insulating member so that when said forward portion of said brush means is worn off, said abutting portion of said insulating member releases said brush means and said retracting spring moves said brush means to a retracted position in which said abutment portion of said insulating member projects beyond said brush means; and a wire conductor extending into said rear end of said tubular pin member and being secured to the same.

8. In an electric brush arrangement, in combination, an insulating holding member having a forwardly located abutment portion, a back plate, and a tubular projection rearwardly projecting from said back plate; brush means mounted in said insulating holding member and having a portion located forwardly of said insulating holding member and being engaged by said abutment portion in an advanced position of said brush means; main coil spring means partly surrounding said tubular projection of said holding member and abutting against said back plate of said holding member for advancing said holding member and thereby said brush means in said advanced position whereby said brush means is pressed against said abutment portion of said holding member when said brush means engages a commutator; and retracting coil spring means located within said tubular projection of said holding member and connecting said brush means with said insulating holding member for urging said forward portion of said brush means into engagement with said abutment portion of said insulating holding member so that when said forward portion of said brush means is worn off, said abutment portion of said insulating holding member releases said brush means and said retracting coil spring means moves said brush means to a retracted position in which said abutment portion of said insulating member projects beyond said brush means.

9. In an electric brush arrangement, in combination, an insulating holding member having a forwardly located abutment portion, a back plate, and a tubular projection rearwardly projecting from said back plate; brush means mounted in said insulating holding member and having a portion located forwardly of said insulating holding member and being engaged by said abutment portion in an advanced position of said brush means; main coil spring means partly surrounding said tubular projection of said holding member and abutting against said back plate of said holding member for advancing said holding member and thereby said brush means in said advanced position whereby said brush means is pressed against said abutment portion of said holding member when said brush means engages a commutator; a pin member secured at the forward end thereof to said brush means and projecting rearwardly from said brush means and through said tubular projection of said insulating holding member, said pin member having a flange at the rear end thereof; a retracting coil spring surrounding said pin member and being located within said tubular projection of said holding member, said retracting coil spring having one end portion abutting against said insulating holding member and a rear end portion abutting against said flange for urging said brush means in a rearward direction and said forward portion of said brush means into engagement in said abutment portion of said insulating holding member so that when said forward portion of said brush means is worn off, said abutment portion of said insulating holding member releases said brush means and said retracting coil spring means moves said brush means to a retracted position in which said abutment portion of said insulating member projects beyond said brush means.

10. In an electric brush arrangement, in combination, an insulating holding member having a forwardly located abutment portion, a back plate, and a tubular projection rearwardly projecting from said back plate; brush means mounted in said insulating holding member and having a portion located forwardly of said insulating holding member and being engaged by said abutment portion in an advanced position of said brush means; main coil spring means partly surrounding said tubular projection of said holding member and abutting against said back plate of said holding member for advancing said holding member and thereby said brush means in said advanced position whereby said brush means is pressed against said abutment portion of said holding member when said brush means engages a commutator; a tubular electrically conductive pin member secured at the forward end thereof to said brush means and projecting rearwardly from said brush means and through said tubular projection of said insulating holding member, said tubular electrically conductive pin member having a flange at the rear end thereof; a retracting coil spring surrounding said pin member and being located within said tubular projection of said holding member, said retracting coil spring having one end portion abutting against said insulating holding member and a rear end portion abutting against said flange for urging said brush means in a rearward direction and said forward portion of said brush means into engagement in said abutment portion of said insulating holding member so that when said forward portion of said brush means is worn off, said abutment portion of said insulating holding member releases said brush means and said retracting coil spring means moves said brush means to a retracted position in which said abutment portion of said insulating member projects beyond said brush means; and a wire conductor extending into said rear end of said tubular pin member and being secured to the same and extending rearwardly along the axis of said main coil spring means.

References Cited in the file of this patent

FOREIGN PATENTS

| | | |
|---|---|---|
| 139,664 | Sweden | Mar. 24, 1953 |
| 621,596 | Germany | Nov. 9, 1935 |